United States Patent

[11] 3,624,293

[72] Inventor Larry K. Baxter
Lexington, Mass.
[21] Appl. No. 21,156
[22] Filed Mar. 19, 1970
[45] Patented Nov. 30, 1971
[73] Assignee Shintron Company, Inc.
Cambridge, Mass.

[54] ELECTRICAL INSCRIBING
7 Claims, 3 Drawing Figs.

[52] U.S. Cl. 178/18
[51] Int. Cl. G08c 21/00
[50] Field of Search 178/18, 19, 20

[56] References Cited

UNITED STATES PATENTS

| | | | |
|---|---|---|---|
| 2,900,446 | 8/1959 | McLaughlin et al. | 178/18 |
| 3,342,935 | 9/1967 | Leifer et al. | 178/19 |
| 3,522,664 | 8/1970 | Lambright et al. | 35/8 |

*Primary Examiner*—Kathleen H. Claffy
*Assistant Examiner*—Horst F. Brauner
*Attorney*—Wolf, Greenfield & Sacks

ABSTRACT: An electrical inscribing system comprises a set of parallel resistance wires orthogonal to and insulatedly separated from another set of parallel resistance wires. The X set of wires is connected between left and right conducting strips. The Y set of wires is connected between top and bottom conducting strips. Signals in time quadrature are applied between the top and bottom strips and then to the left and right strips. The X set and Y set of wires are separated by a ½-mil plastic insulating film. A ¼-inch sheet of plexiglass covers the upper set and may function as a writing surface. An electronic pen may be moved along the plexiglass and is AC coupled to the grid of resistance wires to provide an output signal from its self-contained preamplifier that is representative of the X and Y coordinates of the penpoint.

INVENTOR
LAWRENCE K. BAXTER
BY
Wolf, Greenfield, Hieken + Sacks
ATTORNEYS

ELECTRICAL INSCRIBING

BACKGROUND OF THE INVENTION

The present invention relates in general to electrical inscribing and more particularly concerns a novel electrical inscribing system in which the electronic stylus continuously provides a signal representative of the position of its point on an electrical tablet without establishing conductive contact with wires in the tablet itself. The present invention represents an extension of the principles in copending application Ser. No. 722,335 of Larry K. Baxter filed Apr. 18, 1968, now U.S. Pat. No. 3,591,718 issued 6 July 1971, entitled ELECTROGRAPHY. The present invention is primarily concerned with an improved electronic tablet for use in the system described in the aforesaid copending application.

For background that system utilized a resistive sheet with left and right and top and bottom strips of different resistivity. The system included means for establishing X and Y electric fields representative of X and Y coordinates of each point on the resistive sheet. An electronic stylus was AC coupled to the resistive sheet to pick up signals representative of the X and Y coordinates of the stylus tip. While that system worked well, linearity was not as good as would be desired, and it was difficult to maintain a desired practical sheet resistivity in production at reasonable cost.

Accordingly, it is an important object of this invention to provide an improved electrical inscribing tablet that overcomes one or more of the disadvantages enumerated above.

It is another object of the invention to provide an improved electrical graphic tablet for use with an electronic stylus in nonconductive contact.

It is another object of the invention to achieve one or more of the preceding objects with apparatus that is relatively easy and inexpensive to fabricate with good repeatability in production quantities.

SUMMARY OF THE INVENTION

According to the invention, there is a first set of generally parallel resistive wires connected between first and second conducting strips orthogonal to and insulatedly separated from a second set of generally parallel resistive wires connected between third and fourth conductors. Preferably the insulating layer between the two sets of wires is of the order of ½ mil and the separation between adjacent wires is of the order of 0.3 inches. Preferably an insulating sheet overlays the grid formed by the first and second sets to form a convenient writing surface. Preferably, an electronic stylus having a self-contained preamplifier is moved over the surface to provide an output signal representative of the electric field at the stylus tip when the four conducting strips are appropriately energized so that the output signal is representative of the X and Y coordinates of the stylus tip.

Preferably, signals of the same frequency but displaced in phase by 90° are applied to the conducting strips associated with a set so that the phase of the signal provided by the electronic stylus is directly proportional to the associated coordinate. Preferably, the first and second conducting strips are energized and then the third and fourth strips so that the X and Y signals occur during mutually exclusive alternating contiguous time intervals. Preferably the phase-sensitive signal is at an audio frequency, and this audio frequency is preferably modulated upon a common radio frequency before being applied to the associated strip.

BRIEF DESCRIPTION OF THE DRAWING

Numerous other features, objects and advantages of the invention will become apparent from the following specification when read in connection with the accompanying drawing in which.

DETAILED DESCRIPTION OF PREFERRED EMBODIMENTS

Figure 1:
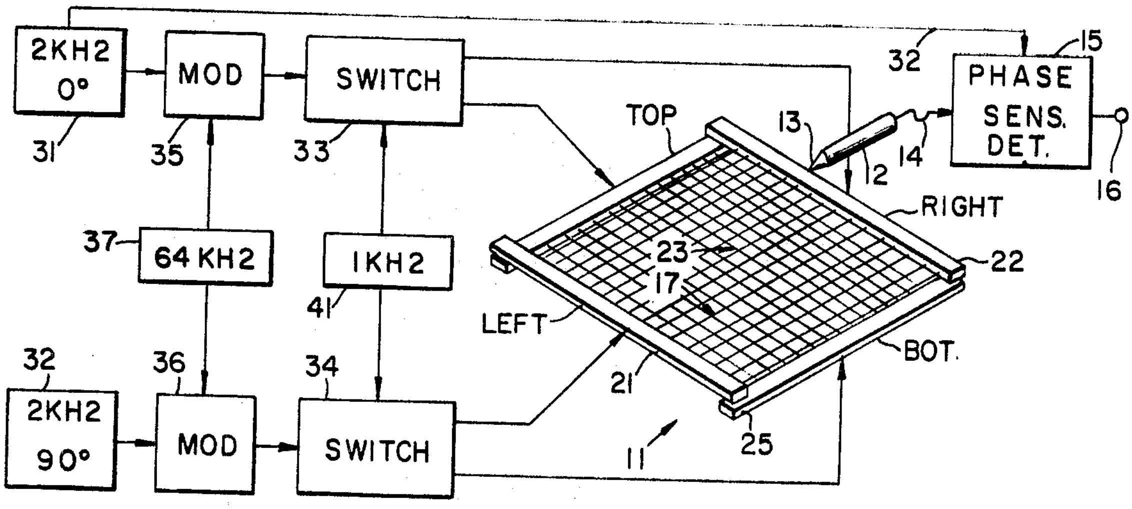
FIG. 1 is a combined block-pictorial diagram illustrating the logical arrangement of a system according to the invention.

With reference now to the drawing and more particularly FIG. 1 thereof, there is shown a combined block-pictorial representation of a preferred embodiment of the invention. The tablet 11 is appropriately energized so that electronic stylus 12 receives a signal representative of the X and Y coordinates of its point 13 that is amplified by its self-contained preamplifier to provide a signal on line 14 that is detected by phase-sensitive detector 15 to provide an output signal on terminal 16 that is first representative of the X-coordinate and then representative of the Y-coordinate.

Figure 2:
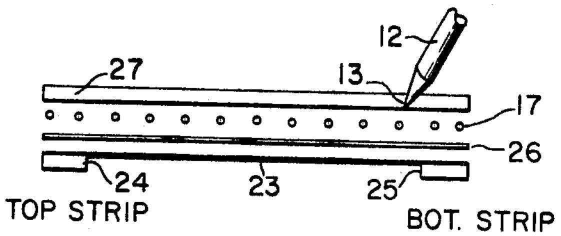
FIG. 2 is an end view of the graphic tablet according to the invention helpful in understanding the relationship of the different elements.

Referring also to FIG. 2 which shows an end view of the tablet according to the invention, the tablet comprises a first set of generally parallel resistance wires 17 connected between a left strip 21 and right strip 22 and an orthogonal set of resistance wires 23 connected between top strip 24 and bottom strip 25. Sets 17 and 23 are insulatedly separated from each other by a thin plastic film 26 of ½-mil mylar or other suitable insulating material. The assembly is then covered by a plate 27 of plexiglass of the order of ¼ inch thick upon which the tip 13 of electronic stylus 12 rides.

In the preferred embodiment of the invention illustrated, stylus position is indicated by the phase of the 2 kHz. signal on output line 14 of electronic stylus 12 relative to that of detectors 15 to provide an output signal on terminal 16 that is representative of first the X and then the Y coordinates of tip 13 above tablet 11. During the X interval switches 33 and 34 are conditioned to energize left strip 21 and right strip 22 with 64 kHz. signals modulated with 2 kHz. signals at 0 and 90°, respectively, provided by modulators 35 and 36, respectively. The 64 kHz. carrier signal is provided by the 64 kHz. carrier signal source 37 to modulators 35 and 36. During the Y-interval the 1 kHz. switching control signal source 41 conditions switches 33 and 34 to energize top conducting strip 24 and bottom conducting strip 25, respectively, with the 64 kHz. signal modulated with 2 kHz. signals at 0 and 90°, respectively. As the point 13 of the electronic stylus 12 moves from one end of a wire to the other, the demodulated signal from the preamplifier is a 2 kHz. signal varying linearly in phase from 0 to 90° and is easily converted to digital or analog output, preferably by use of a phase-locked loop.

Figure 3:
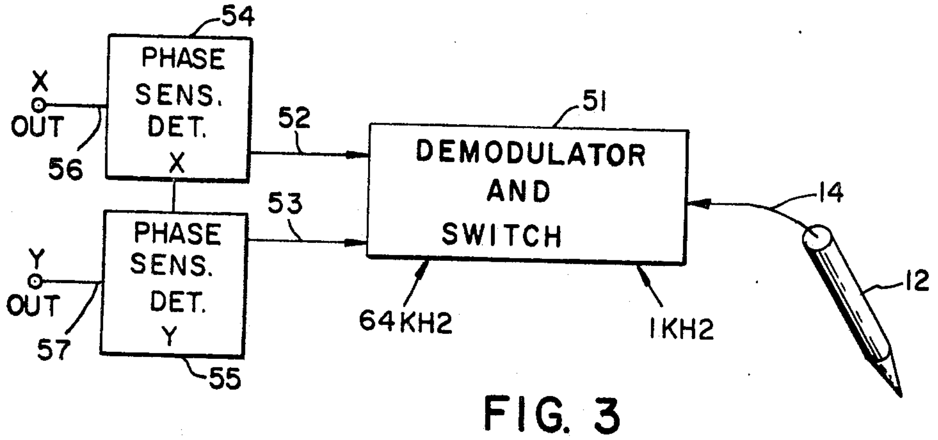
FIG. 3 shows a preferred form of the phase detector.

Referring to FIG. 3, there is shown a block diagram generally illustrating the logical arrangement of a phase-sensitive detector providing separate X- and Y- outputs. The system of FIG. 3 corresponds generally to that disclosed in the aforesaid copending application; hence, the disclosure there together with this brief description is adequate to practice the invention. The demodulator and switch 51 demodulates the 64 kHz. signal on line 14, preferably by beating that signal with the 64 kHz. signal from source 37 (FIG. 1). The 1 kHz. signal from source 41 (FIG. 1) may control the switching to alternately provide an X- signal on line 52 and then a Y-signal on line 53 at 2 kHz. for detection in the X phase-sensitive detector 54 and the Y phase-sensitive detector 55, respectively, to provide X and Y signals on lines 56 and 57, respectively.

The high impedance preamplifier in electronic stylus 12 has its input at point 13 moving in a plane parallel to the sets 17 and 23 about ¼ inch above them as it moves over the plexiglass plate 27. The tip 13 thus senses the electric field produced typically by several wires in the Y-direction at one time (approximately 1 millisecond) and then several wires in the X-direction in the next 1-millisecond interval. During the time Y-position is read, switches 33 and 34 preferably ground the other output lines and vice versa. This grounding of the unused set of wires shields the signal slightly, but does not disturb the accuracy of measurement by more than ½ percent provided the point 13 is brought no closer than the wire separation to the wires. A typical separation between wires is between 3/16 inches and ⅜ inches, higher separations causing slightly greater inaccuracy. Each of the wires in sets 17 and 23 may be ordinary potentiometer wire ½ mil in diameter of resistivity 20 ohms/inch.

Numerous techniques are available for fabricating a tablet according to the invention. For example, the wire sets may be printed upon an insulating film. Resistance wires may be imbedded in a plastic sheet. The tablet may be energized in numerous different ways. For example, the X and Y sets could have the phase-bearing modulation modulated on respective carrier signals of different frequencies to provide both X and Y information simultaneously, the circuitry in the electronic stylus including filter means for separating the two carrier signals before recovering the audio frequency phase-carrying signal.

An actual embodiment of the invention is a 10-inch square tablet with 30 wires in each set about 0.3 inches apart and provides an accuracy of measurement within ½ percent.

It is evident that those skilled in the art may now make numerous uses and modifications of the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Electronic tablet means comprising,
first, second, third and fourth conductors,
a first set of generally parallel resistive wires connected between said first and second conductors,
a second set of generally parallel resistive wires connected between said third and fourth conductors othogonal to said first set,
and an insulating means disposed intermediate said first and second sets for insulatedly separating said sets,
the resistance of each of said resistive wires being high compared to that of each of said conductors.

2. An electronic inscribing tablet in accordance with claim 1 wherein the insulating layer between said two sets of wires is smaller in thickness than the separation between adjacent parallel resistive wires in a set.

3. An electronic inscribing tablet in accordance with claim 2 and wherein said insulating layer has a thickness of the order of ½ mil between said two sets of wires.

4. An electronic inscribing tablet in accordance with claim 2 and further comprising an insulating sheet overlaying the grid formed by said first and second sets to comprise a convenient writing surface.

5. An electronic inscribing tablet in accordance with claim 1 and further comprising a source of signals of the same frequency substantially in time quadrature,
and means for coupling said time quadrature signals to respective ones of the conductors associated with a set so that the phase of the signal along a resistive wire in a set is directly proportional to the associated coordinate.

6. An electronic inscribing tablet in accordance with claim 5 and further comprising,
means for first coupling said time quadrature signals to said first and second conductors and then to said third and fourth conductors to provide orthogonal components of a position-indicative signal during mutually exclusive alternating substantially contiguous time intervals.

7. Electrographic apparatus comprising:
a first pair of elongated conductors with each spaced one from the other,
a second pair of elongated conductors with each spaced one from the other,
said first and second pairs being disposed in a quadrilateral arrangement with the first pair of conductors insulatedly separated from the second pair of conductors,
a first set of generally parallel resistive wires connected between said first pair of elongated conductors and defining a first plane,
a second set of generally parallel resistive wires connected between said second pair of elongated conductors and defining a second plane,
said first set of generally parallel resistive wires being orthogonal to said second set,
and an insulating means disposed intermediate said first and second sets for insulatedly separating said sets,
said first and second sets being disposed so that said first and second planes are substantially parallel,
each said resistive wire having a resistance that is high in comparison to each of said elongated conductors of said pairs of conductors.

* * * * *